H. B. HAZEN AND G. HENDERSON.
SPARE TIRE CARRIER.
APPLICATION FILED OCT. 2, 1919.
1,371,088.
Patented Mar. 8, 1921.
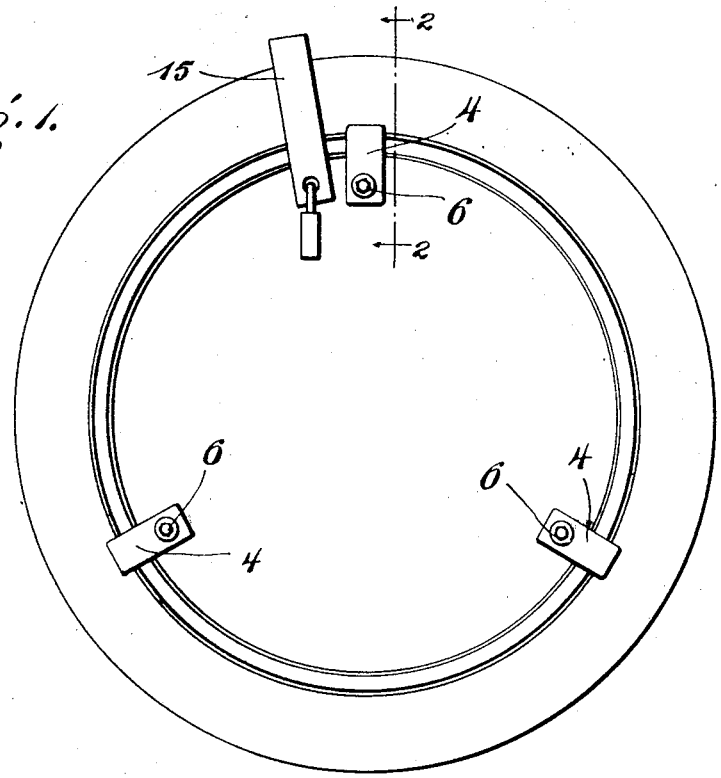
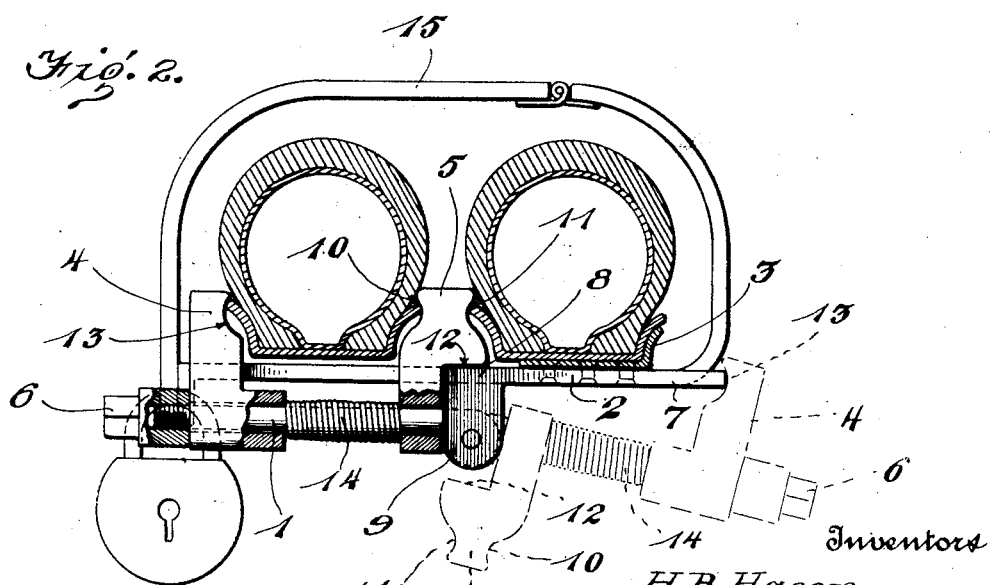
Witness
J. R. Pierce
Inventors
H. B. Hazen
George Henderson
By H. B. Willson & Co.
Attorneys

UNITED STATES PATENT OFFICE.

HARRY B. HAZEN AND GEORGE HENDERSON, OF SHARON, PENNSYLVANIA.

SPARE-TIRE CARRIER.

1,371,088.     Specification of Letters Patent.     Patented Mar. 8, 1921.

Application filed October 2, 1919. Serial No. 327,851.

*To all whom it may concern:*

Be it known that we, HARRY B. HAZEN and GEORGE HENDERSON, citizens of the United States, residing at Sharon, in the county of Mercer and State of Pennsylvania, have invented certain new and useful Improvements in Spare-Tire Carriers; and we do declare the following to be a full, clear, and exact description of the invention, such as will enable others skilled in the art to which it appertains to make and use the same.

This invention relates to improvements in spare tire carriers such as are used on automobiles.

The primary object of the invention is to provide a device for carrying a second spare tire, which is designed and intended to be associated with the stationary rim usually attached to the rear of an automobile.

Another object of the invention is to provide a device of the above mentioned character which may be readily brought to carrying or operative position when needed or desired and may be swung down and out of the way when not in use, it having means incorporated therewith to hold it in either position.

A further object of the invention is to provide a device of the above mentioned type which is simple in construction, effective in use, strong, durable and comparatively inexpensive to manufacture.

Other objects and advantages of the invention may become apparent during the course of the following description.

In the accompanying drawings forming a part of this specification, and in which like numerals are employed to designate like parts throughout the same, Figure 1 is an elevation of a tire equipped with my improved second spare tire carrier.

Fig. 2 is an enlarged section on the plane of the line 2—2 of Fig. 1, illustrating more clearly the device as constructed in accordance with our invention.

In carrying out our invention we employ a plurality of arms 1 which are pivotally mounted on attaching members 2, which in turn are carried by, and secured to, the stationary rim or other support 3 usually carried by the vehicle. A pair of rim engaging members 4 and 5 are mounted on and carried by the arm 1 and are slidable and rotatable on said arm. We also employ suitable means such as nuts 6 to force the rim engaging members 4 and 5 into tight engagement with the rims, as shown. The parts are so constructed and arranged as to permit the arm 1 and members 4 and 5 to be readily brought to carrying position when desired and then swung down and beneath the member 2 and held in latter position when so desired.

Inasmuch as each of the arms 1, rim engaging members 4 and 5 and other parts in each of the devices are of a like construction, a description of one will suffice for all three.

The attaching member or plate 2 is riveted or otherwise securely fastened to the stationary rim 3 and it extends outwardly beyond the rim on both sides thereof as at 7 and 8, and is provided with a depending leg 9 to which the arm or bolt 1 is pivotally connected. While we have shown the plate 2 as being connected to a rim 3, we desire it to be understood that it may be equally well attached to any other suitable support carried by the automobile.

The rim engaging members 4 and 5 are slidable and rotatable on the arm 1. The inner one 5, is curved inward on its opposite ends to provide seats 10 and 11 which engage and bear against both of the rims between which it is positioned when in operative or carrying position. This member 5 is also provided with a shoulder 12 which rests on the extended portion 8 of the plate 2 and bears against the leg 9 of said plate and thus holds the arm 1 in alinement with the plate 2. The other rim engaging hook or member 4 is provided with a similar seat 13 which serves a double purpose, viz., to engage one of the rims when the parts are in carrying position, in the one instance, and to engage and hook over the extended part 7 of the plate 2 to hold the parts in a folded position in the other instance.

In order to cause the rim engaging member or hook 4 to automatically and readily become disengaged from either carrying or non-carrying position we interpose a coiled spring 14 between the inner faces of the members 4 and 5. This spring 14 not only forces the member 4 out of engagement with the tire rim or extension 7 of the plate 2 as the case may be, but it also serves to force the other hook member 5 tightly against the depending leg 9 and the shoulder 12 against the extension 8, thereby preventing downward movement of the bolt 1. It is obvious that such disengagement of the rim engaging member 4 will take place when the nut 6 is loosened. When thus disengaged the arm 1 and both of the rim engaging members 4 and 5 may be moved either to carrying or non-carrying position, whichever may be desired.

To prevent unnecessary loss or theft of the tires, we desire to use a locking device of any suitable type, but preferably as shown at 15 which is of a size and shape to fit two tires.

It is believed that the manner of using the device is obvious from the foregoing description, and further explanation is therefore deemed unnecessary.

It is to be understood that the form of my invention herein shown and described is to be taken as a preferred form of the same, and that various changes in shape, size, and arrangement of parts may be resorted to without departing from the spirit of the invention or the scope of the subjoined claims.

Having thus described our invention, what we claim is:

1. In a spare tire carrier, a stationary support to be carried by the vehicle, an arm pivoted to said support, and a pair of rim engaging members carried by said arm, said rim engaging members and arm being adapted to be swung out and in alinement with the support when in use and swung toward the support when not in use, one of said members being provided with a seat to engage the rim when in operative position and to engage the support when in inoperative position.

2. In a spare tire carrier a stationary support carried by a vehicle, an arm pivoted to said support, a pair of rim engaging members mounted on said arm, one of said rim engaging members being rotatable on said arm and provided with a seat adapted to engage a rim, said arm to be swung out and in alinement with said support when in use and toward the support when not in use, said support being provided with means to engage said seat and hold the arm in the last named position, said seat and means with which it co-acts being engageable when the rim engaging member is rotated, and means engageable with one of said rim engaging members to force both of said members into engagement with a rim.

3. In a spare tire carrier for vehicles, the combination with a stationary support carried by a vehicle, of a plate secured to said support, said plate extending beyond said support, an arm pivoted to said plate, rim engaging members carried by said arm, one of said rim engaging members being rotatable on said arm and provided with a seat to engage a rim, said arm being adapted to be swung in alinement with said plate when in use and swung toward and under said plate when not in use, said extended portion of the plate being adapted to engage the seat in the said rim engaging member and hold the arm in the last named position.

4. In a spare tire carrier for vehicles, the combination with a stationary rim carried by a vehicle, of a plate secured to said stationary rim, a bolt pivoted to said plate, a pair of rim engaging members rotatable and slidable on said bolt, said rim engaging members being provided with rim engaging seats, a nut carried by the bolt adapted to force the rim engaging members tightly into engagement with a pair of rims, and a coiled spring disposed between said rim engaging members to force them apart when the nut is loosened, said arm and rim engaging members being adapted to swing into alinement with the plate when in use and toward the plate when not in use, one of said rim engaging members being adapted to engage the plate and hold the arm in inoperative position.

In testimony whereof we have hereunto set our hands.

HARRY B. HAZEN.
GEORGE HENDERSON.